(12) United States Patent
Choe et al.

(10) Patent No.: US 10,729,121 B2
(45) Date of Patent: Aug. 4, 2020

(54) BIODEGRADABLE BAIT STATION FOR LIQUID ANT BAIT

(71) Applicants: Dong-Hwan Choe, Riverside, CA (US); Michael K. Rust, Riverside, CA (US); Mark Hoddle, Riverside, CA (US); Ashok Mulchandani, Riverside, CA (US)

(72) Inventors: Dong-Hwan Choe, Riverside, CA (US); Michael K. Rust, Riverside, CA (US); Mark Hoddle, Riverside, CA (US); Ashok Mulchandani, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 326 days.

(21) Appl. No.: 15/329,181

(22) PCT Filed: Jul. 27, 2015

(86) PCT No.: PCT/US2015/042210
§ 371 (c)(1),
(2) Date: Jan. 25, 2017

(87) PCT Pub. No.: WO2016/015043
PCT Pub. Date: Jan. 28, 2016

(65) Prior Publication Data
US 2017/0208793 A1    Jul. 27, 2017

Related U.S. Application Data

(60) Provisional application No. 62/029,163, filed on Jul. 25, 2014.

(51) Int. Cl.
*A01M 1/20* (2006.01)
*A01M 1/02* (2006.01)
(Continued)

(52) U.S. Cl.
CPC .......... *A01M 1/2011* (2013.01); *A01M 1/023* (2013.01); *A01N 25/04* (2013.01); *A01N 51/00* (2013.01); *A01N 59/14* (2013.01)

(58) Field of Classification Search
CPC ...... A01M 1/2011; A01M 1/023; A01M 1/20; A01M 1/2005; A01N 25/04; A01N 51/00
See application file for complete search history.

(56) References Cited

U.S. PATENT DOCUMENTS 2,004,121 A * 6/1935 Loibl, Jr. ............ A01M 1/2005
                                                           43/131
2,045,018 A * 6/1936 Loibl, Jr. ............ A01M 1/2005
                                                           43/131
(Continued)

FOREIGN PATENT DOCUMENTS

EP          0254257 A2 *  1/1988   ........... A01N 25/006
JP       2005-143413 A    6/2005

OTHER PUBLICATIONS

Buczkowski et al., "Polyacrylamide Hydrogels: An Effective Tool for Delivering Liquid Baits to Pest Ants (Hymenoptera: Formicidae", Journal of Economic Entomology, Apr. 2014, vol. 107, No. 2, pp. 748-757.

(Continued)

*Primary Examiner* — Michael H Wang
(74) *Attorney, Agent, or Firm* — Buchanan Ingersoll & Rooney PC

(57) ABSTRACT

A biodegradable bait station is disclosed that can be used with liquid baits targeting pest ants in urban, agricultural, and natural setting, which can overcome several limitations that most of other liquid bait stations currently experience. For example, instead of keeping a large quantity of liquid bait in a reservoir, a small amount, for example, 10-20 ml of sugary liquid bait with an insecticide, for example, boric acid, thiamethoxam, imidacloprid, will be contained in a (Continued)

biodegradable cylindrical container with one open end. The open end will be plugged with a piece of water absorbent polymer or gel, for example, polyacrylamide gel, sodium alginate. The water absorbent polymer or gel absorbs the liquid bait and expands inside of the cylindrical container so that it will function as a polymer "wick" to deliver a small amount of the liquid bait to foraging ants.

21 Claims, 2 Drawing Sheets

(51) Int. Cl.
*A01N 25/04* (2006.01)
*A01N 51/00* (2006.01)
*A01N 59/14* (2006.01)

(56) References Cited

U.S. PATENT DOCUMENTS

| 2,176,345 | A | * | 10/1939 | Hurwitt | A01M 1/2011 43/131 |
|---|---|---|---|---|---|
| 2,208,997 | A | * | 7/1940 | St. John | A01M 1/02 239/45 |
| 5,943,816 | A | * | 8/1999 | Hyatt | A01M 1/2005 239/34 |
| 5,953,855 | A | * | 9/1999 | Edwards | A01M 1/026 43/132.1 |
| 6,158,166 | A | * | 12/2000 | Snell | A01M 1/026 43/121 |
| 6,189,259 | B1 | * | 2/2001 | Soller | A01M 1/2005 43/131 |
| 6,202,342 | B1 | * | 3/2001 | Edwards | A01M 1/026 43/132.1 |
| 6,606,816 | B2 | * | 8/2003 | Oi | A01M 1/026 106/15.05 |
| 6,649,182 | B2 | * | 11/2003 | Hsieh | A01G 13/105 424/405 |
| 6,922,940 | B2 | * | 8/2005 | Rollins | A01M 1/026 43/124 |
| 2002/0046483 | A1 | * | 4/2002 | Snell | A01M 1/026 43/131 |
| 2005/0284017 | A1 | * | 12/2005 | Kongshaug | A01M 1/2005 43/131 |
| 2006/0021275 | A1 | * | 2/2006 | Howse | A01M 1/023 43/131 |
| 2008/0302000 | A1 | * | 12/2008 | Kidder | A01M 1/2005 43/131 |
| 2009/0000181 | A1 | * | 1/2009 | Cink | A01M 1/026 43/132.1 |
| 2011/0265369 | A1 | * | 11/2011 | Cink | A01M 1/026 43/131 |
| 2012/0085020 | A1 | * | 4/2012 | Cink | A01M 1/023 43/107 |
| 2013/0067795 | A1 | * | 3/2013 | Wesson | A01M 1/20 43/107 |
| 2016/0374326 | A1 | * | 12/2016 | Azzarello | A01M 1/026 43/131 |
| 2017/0035039 | A1 | * | 2/2017 | Sandford | A01M 1/023 |
| 2017/0181427 | A1 | * | 6/2017 | Shani | C05G 5/45 |

OTHER PUBLICATIONS

International Search Report (PCT/ISA/210) dated Oct. 19, 2015, by the United States Patent Office as the International Searching Authority for International Application No. PCT/US2015/042210.
Written Opinion (PCT/ISA/237) dated Oct. 19, 2015, by the United States Patent Office as the International Searching Authority for International Application No. PCT/US2015/042210.

* cited by examiner

BIODEGRADABLE BAIT STATION FOR LIQUID ANT BAIT

CROSS-REFERENCE TO RELATED APPLICATIONS

This application claims the benefit of U.S. Provisional Application No. 62/029,163, filed Jul. 25, 2014, and under 35 U.S.C. § 371 to International Application No. PCT/US2015/042210, filed Jul. 27, 2015, the entire contents of which are hereby incorporated herein by reference.

This invention was made with Government support under Grant No. DMR0213695 awarded by the National Science Foundation. The Government has certain rights in this invention.

TECHNICAL FIELD

The present invention pertains to the development of biodegradable bait station for liquid ant bait.

BACKGROUND

Ants rank as one of the most important pest complexes in the structural pest control industry. Because many pest ants are naturally adapted for feeding on sugary liquids, there is little doubt in that sugar-based liquid ant baits would be among the ideal choices for pest ant management for urban, agricultural, and natural settings. When properly designed and deployed, the bait strategies could also bring many other benefits including the lower risk of non-target impact, reduced environmental contamination, and minimal off-site movement of applied pesticides. However, for a broader adoption of the liquid baiting for integrated pest management (IPM) of ants, there are several requirements that are need to be addressed. Among those are (1) the bait stations need to be designed to prevent the access of non-target organisms, (2) the liquid bait needs to be consumed by the target pest ants before it degrades, (3) the liquid bait needs to be protected from extreme dry or wet environmental conditions (for example, hot weather, irrigation, or natural precipitation) to maintain its optimal concentration and consistency, (4) the liquid bait needs to be protected from spillage and leakage, and (5) the bait station and methods of the application need to be designed in a way that would minimize the service and maintenance.

Most of bait delivery systems currently available typically incorporate simple plastic containers, which can hold liquid or gel type bait materials. These bait stations (or bait housing) are believed to protect the bait materials from outer environmental factors, such as low or excessive moisture, dusts, etc. and non-target organisms. In some cases, bait stations have large bait reservoirs that can hold a relatively large amount of liquid bait (500-1,500 ml) to allow the system to deliver the liquid bait to larger population of target ants without the need of frequent refill or service. However, most current systems have potential problems such as bait spoilage, increased concentration of toxicant in the bait (caused by water loss of the liquid bait at the dispenser), and increased bait viscosity (caused by water loss and present of sugar in the liquid bait), which all could be potentially detrimental for continuous consumption of the bait by the target ant population.

In accordance with an exemplary embodiment, a novel bait station is disclosed, which address the important needs of a successful baiting.

SUMMARY

In accordance with an exemplary embodiment, a biodegradable bait station for liquid bait is disclosed, the bait station comprising: a biodegradable bait reservoir; and a polymer or gel matrix configured to deliver an amount of liquid bait stored in the bait station.

In accordance with an exemplary embodiment, a method of delivering liquid bait is disclosed, the method comprising: providing a reservoir of liquid bait; and delivering a small amount of the liquid bait via a polymer or gel, which wicks the liquid bait from the reservoir.

DETAILED DESCRIPTION

Figure 1:
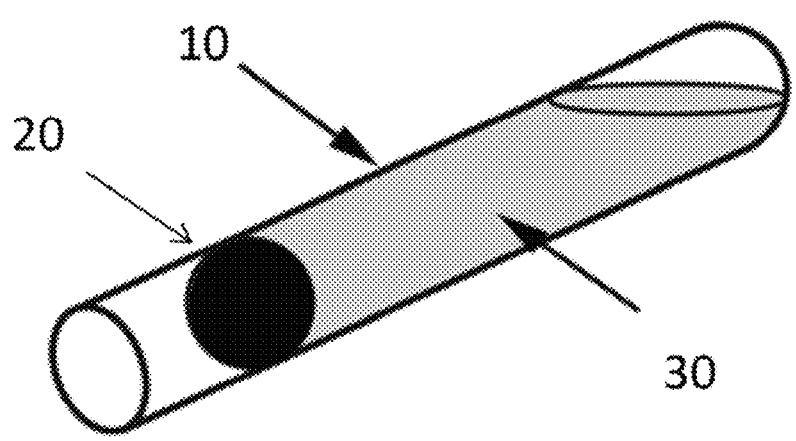
FIG. 1 is a schematic diagram of a biodegradable bait station for liquid bait in accordance with an exemplary embodiment.

In accordance with an exemplary embodiment, a novel bait station design is disclosed that can be used with liquid baits targeting pest ants in urban, agricultural, and natural settings. This biodegradable bait station can overcome several limitations that most of other liquid bait stations currently experience. Instead of keeping a large quantity of liquid bait in a reservoir, a small amount (for example, 10-20 ml) of sugary liquid bait with an insecticide (for example, boric acid, thiamethoxam, imidacloprid, etc.) can be contained in a biodegradable cylindrical container with one open end. The open end will be plugged with a piece of water absorbent polymer or gel (for example, polyacrylamide gel, sodium alginate, etc.). The water absorbent polymer or gel absorbs the liquid bait and expands inside of the cylindrical container so that it will function as a polymer "wick" to deliver a small amount of the liquid bait to foraging ants. The porosity of the polymer or gel can be designed to allow the liquid bait to efficiently diffuse through the polymer or gel matrix.

In accordance with an exemplary embodiment, the biodegradable bait station includes novel features including: (1) use of biodegradable materials for construction of the bait station, and (2) use of water absorbent polymer or gel to design the part of bait station which allows slow and controlled dispense of liquid bait from the bait reservoir.

In accordance with an exemplary embodiment, the biodegradable bait station has several advantages over known stations, including:
  (1) Because of the water absorbent polymer or gel plugs, the bait stations can be easily deployed inside bushes in gardens or under the trees without leakage or spillage of the liquid bait,
  (2) The liquid bait will be also protected from excessive hydration or dehydration by the protective bait station housing and the controlled moisture release through the absorbent polymer or gel,
  (3) Because only a small amount of liquid bait will be used per bait station, it is likely that the liquid bait will be completely consumed with 1-2 weeks before a significant level of bait degradation occurs,
  (4) The bait station is also biodegradable, so there will be no need to pick up the empty bait stations for cleanup, and (5) Because of the biodegradability, neither maintenance nor service is required for the bait station.

Because many pest ants are naturally adapted for feeding on sugary liquids, there is little doubt in that sugar-based liquid ant baits would be among the ideal choices for pest ant management for urban, agricultural, and natural settings. When properly designed and deployed, the bait strategies could also bring many other benefits including the lower risk of non-target impact, reduced environmental contamination, and minimal off-site movement of applied pesticides. The development of biodegradable bait station for liquid ant bait described in this disclosure, can allow for the implementation of baiting techniques for various settings and situations with improved efficiency and efficacy compared to other currently available bait delivery systems.

FIG. 1 is a schematic diagram of a biodegradable bait station for liquid bait in accordance with an exemplary embodiment. As shown in FIG. 1, a cylindrical bait station or bait reservoir made with biodegradable material 10 contains a piece of a polymer or gel matrix 20 that is porous enough to deliver a small amount of liquid bait 30 stored in the bait station.

In accordance with an exemplary embodiment, the biodegradable bait station for liquid bait targeting pest ants can include a small amount, for example, 10 ml to 20 ml of sugar-based liquid bait with an insecticide, for example, boric acid, thiamethoxam, imidacloprid, etc., which will be contained in a biodegradable plastic cylindrical container with one open end. The biodegradable plastic bait station can be made out of bioplastics that are derived from renewable biomass sources, such as vegetable fats and oils, cornstarch, pea starch or microbiota. The examples can include, but are not limited to, starch-based plastics, cellulose-based plastics, polylactic acid (PLA), poly-3-hydroxybutyrate (PHB), polyhydroxyalkanoates (PHA), and bio-derived polyethylene.

In accordance with an exemplary embodiment, the open end of the bait station can be plugged with a water absorbent polymer, for example, polyacrylamide, sodium alginate, etc. The water absorbent polymer or gel will absorb the liquid bait and expand inside of the cylindrical container so that it will function as a "wick" to deliver a small amount of the liquid bait on the other side of the polymer or gel for the foraging ants. The porosity of the water absorbent polymer or gel will allow the pesticide substance in the liquid bait to freely travel through the materials along with sucrose water bait matrix. As ants consume the liquid that is available on the surface of the polymer or gel, a fresh flow of the liquid bait will diffuse through the porous polymer or gel matrix, becoming available for the ants. As the amount of liquid bait decreases in the biodegradable bait container, the polymer or gel wick will travel deeper into the cylindrical container by the vacuum that is generated by the reduction of the liquid bait and tight seal between the polymer wick and inner wall of the bait container.

In accordance with an exemplary embodiment, the biodegradable bait station for liquid ant bait can be used with an insecticide (or a rate of an insecticide) that results in a relatively slow action, for example, 3-4 days until mortality in appose to less than (<) 1 day until mortality, upon ingestion. The biodegradable bait station can be used for sensitive accounts or settings where insecticide sprays are not desired, for example, organic orchards, houses with pets, or areas that are venerable for insecticide off-site movement or wash-off, etc.

In accordance with an exemplary embodiment, the bait stations can be small enough so that they could be simply placed where vegetation provides protection from direct sunlight. For example, inside of bush around houses, or under the individual citrus trees in the orchard would be the ideal places to put these bait stations. In addition, because the bait station is relatively leak-proof compared to other bait station for liquid baits, the bait station can be tossed to the locations where the ant activity was observed or the ant control is desired (for example, inside of a bush, base of orchard tree, etc.). Once all of the liquid bait is consumed by the ants, the bait stations do not need to be collected because it will be degraded. If necessary, addition bait stations can be applied.

Figure 2:
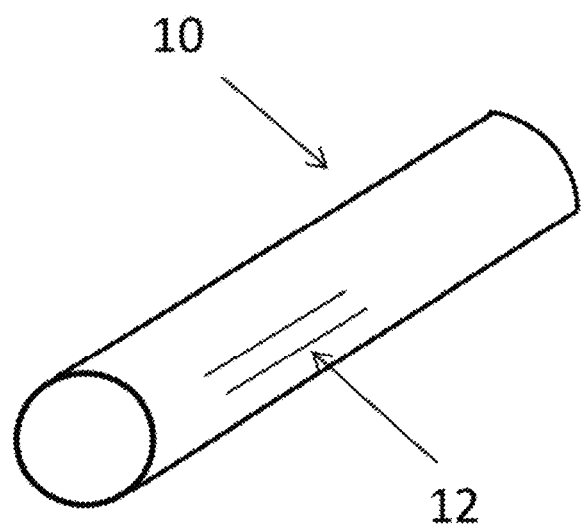
FIG. 2 is a schematic diagram of a biodegradable bait station having a groove or guidelines

In accordance with an exemplary embodiment, as shown in FIG. 2, to improve the movement of the polymer or gel wick inside of the bait stations, the inner surface of bait station can include a groove or guidelines 12.

In accordance with an exemplary embodiment, to improve the initial discovery of the bait stations by the target ant species, attractant pheromone(s) of target ants could be incorporated with the bait station or the liquid bait.

In accordance with an exemplary embodiment, the polymer or gel material for the bait delivery can be modified for the maximum efficacy of bait delivery by changing its physicochemical property (for example, porosity).

In accordance with an exemplary embodiment, the liquid bait could be modified to improve its viscosity and stability by adding additives which do not affect the palatability of the liquid bait by the ants.

In accordance with an exemplary embodiment, because the whole bait station can be biodegradable, such that neither maintenance nor service is required. In addition, because of the permeable polymer or gel plugs, the bait stations can be easily deployed inside bushes in the garden or under the trees in orchards without leakage or spillage. The liquid bait will be also protected from excessive hydration or dehydration by the bait station tube and the combination of absorbent polymer or gel, and relatively stable and continuous supply of moisture from the bait reservoir. Because only a small amount of liquid bait will be used per bait station, it is likely that the liquid bait will be completely consumed with 1-2 weeks before a significant level of bait degradation occurs. Lastly, the bait station is biodegradable, so there will be no need to pick up the used bait stations for cleanup or fill-up for next use.

The invention is not limited, however, to the embodiments and variations described above and illustrated in the drawing figures. Various changes, modifications and equivalents could be effected by one skilled in the art without departing from the spirit and scope of the invention as defined in the appended claims. It is expressly intended that all such changes, modifications and equivalents which fall within the scope of the claims are embraced by the claims.

What is claimed is:

1. A biodegradable bait station for liquid ant bait, the bait station comprising:
   a biodegradable bait reservoir having a closed end and an open end;
   a reservoir of liquid bait housed inside the biodegradable bait reservoir; and
   a polymer or gel matrix plug configured to wick an amount of the liquid bait housed in the biodegradable bait reservoir, the polymer or gel matrix plug arranged on the open end of the biodegradable bait reservoir and configured to retain the liquid bait inside the biodegradable bait reservoir and as the reservoir of liquid bait housed in the biodegradable bait reservoir decreases, the polymer or gel matrix plug moves into the biodegradable bait station as a result of a reduction of the liquid bait and a seal between the polymer or gel matrix plug and an inner wall of the biodegradable bait reservoir.

2. The bait station of claim 1, wherein the biodegradable bait reservoir comprises a cylindrical housing, and wherein the polymer or gel matrix plug is in the open end of the cylindrical housing.

3. The bait station of claim 2, wherein the polymer or gel matrix plug is a water absorbent polymer or gel configured to absorb the liquid bait and expands inside of the cylindrical container, such that the polymer or gel matrix plug functions as a polymer wick.

4. The bait station of claim 3, wherein the polymer wick is configured to deliver the liquid bait to foraging ants.

5. The bait station of claim 3, wherein the water absorbent polymer or gel is a polyacrylamide gel and/or sodium alginate.

6. The bait station of claim 2, comprising:
attractant pheromone(s) of target ants, which is incorporated into the liquid bait.

7. The bait station of claim 1, comprising:
a sugary liquid bait with an insecticide, which is contained in the bait reservoir.

8. The bait station of claim 7, wherein the insecticide is boric acid, thiamethoxam, and/or imidacloprid.

9. The bait station of claim 1, wherein a porosity of the polymer or gel matrix plug is configured to allow the liquid bait to efficiently diffuse through the polymer or gel matrix.

10. The bait station of claim 1, wherein the biodegradable bait reservoir is comprised of a bioplastic that is derived from renewable biomass sources.

11. The bait station of claim 10, wherein the bioplastic is vegetable fats and oils, corn starch, pea starch, or microbiota.

12. The bait station of claim 10, wherein the bioplastic is a starch-based plastics, cellulose-based plastics, polylactic acid (PLA), poly-3-hydroxybutyrate (PHB), polyhydroxyalkanoates (PHA), and bio-derived polyethylene.

13. The bait station of claim 1, comprising:
an insecticide that results in a slow mortality upon ingestion.

14. The bait station of claim 13, wherein the slow mortality is 3-4 days until mortality as opposed to less than about 1 day until mortality.

15. The bait station of claim 1, comprising:
a groove or guideline on an inner surface of the bait station, the groove or guideline configured to assist with the movement of the polymer or gel matrix plug into the biodegradable bait reservoir on the inner wall of the biodegradable bait reservoir.

16. The bait station of claim 1, comprising:
attractant pheromone(s) of target ants, which is incorporated into the bait station.

17. A method of delivering liquid bait, the method comprising:
housing a reservoir of liquid bait in a biodegradable bait reservoir; and
delivering an amount of the liquid bait via a polymer or gel matrix plug, which wicks the liquid bait from the reservoir of liquid bait housed in the biodegradable bait reservoir, and wherein the polymer or gel matrix plug is arranged on an open end of the biodegradable bait reservoir and configured to retain the liquid bait inside the biodegradable bait reservoir and as the reservoir of liquid bait housed in the biodegradable bait reservoir decreases, the polymer or gel matrix plug moves into the biodegradable bait station as a result of a reduction of the liquid bait and a seal between the polymer or gel matrix plug and an inner wall of the biodegradable bait reservoir.

18. The method of claim 17, comprising:
housing the reservoir of liquid bait in a biodegradable cylindrical housing.

19. The method of claim 18, wherein the or gel matrix plug is a water absorbent polymer or gel configured to absorb the liquid bait and expand inside of the cylindrical container, such that the polymer or gel matrix plug functions as a polymer wick.

20. The method of claim 17, comprising:
a sugary liquid bait with an insecticide, which is contained in the bait reservoir, and the insecticide is boric acid, thiamethoxam, and/or imidacloprid.

21. The method of claim 19, wherein the water absorbent polymer or gel is a polyacrylamide gel and/or sodium alginate.

* * * * *